US008964947B1

(12) United States Patent
Noolu et al.

(10) Patent No.: US 8,964,947 B1
(45) Date of Patent: Feb. 24, 2015

(54) APPROACHES FOR SHARING DATA BETWEEN ELECTRONIC DEVICES

(71) Applicant: Amazon Technologies, Inc., Reno, NV (US)

(72) Inventors: Rama Noolu, Sunnyvale, CA (US); Kiran Kumar Edara, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/794,564

(22) Filed: Mar. 11, 2013

(51) Int. Cl.
*H04M 1/64* (2006.01)
*H04M 3/54* (2006.01)

(52) U.S. Cl.
CPC ................... *H04M 3/541* (2013.01)
USPC ................... 379/88.01; 379/88.03

(58) Field of Classification Search
CPC ......... H04W 4/02; H04W 4/023; H04W 4/16; H04W 4/206; H04W 76/02; H04W 8/18; H04W 8/26; H04W 40/20; H04W 4/20; H04W 8/06; H04W 8/265; H04W 4/08; H04W 76/025; H04M 1/575; H04M 1/72572; H04M 15/7652

USPC ........ 379/25, 207.12, 372, 69, 93.32, 201.01, 379/201.04, 370; 455/41.2, 440, 452, 457, 455/404.2, 414.2, 448, 456.1, 460
See application file for complete search history.

(56) References Cited

U.S. PATENT DOCUMENTS

| | | | |
|---|---|---|---|
| 2008/0085682 A1* | 4/2008 | Rao .................................. | 455/74 |
| 2009/0094531 A1* | 4/2009 | Danieli et al. ................. | 715/753 |
| 2009/0143056 A1* | 6/2009 | Tang et al. ..................... | 455/418 |
| 2011/0083111 A1* | 4/2011 | Forutanpour et al. ......... | 715/863 |
| 2013/0309996 A1* | 11/2013 | Siegel et al. .................. | 455/405 |
| 2014/0011448 A1* | 1/2014 | Yang ............................. | 455/41.1 |

* cited by examiner

*Primary Examiner* — Akelaw Teshale
(74) *Attorney, Agent, or Firm* — Novak Druce Connolly Bove + Quigg LLP

(57) ABSTRACT

Systems and approaches are provided to enable multiple user devices to share data between devices. In one scenario, a user may click on or touch a telephone hyperlink from a browser of a desktop computer to initiate a telephone call from the user's mobile phone. In another situation, a user may begin various computing tasks from a tablet in the evening, share data associated relating to her work with a business computer, and complete her tasks the next day in the office with little to no minimal disruption to her work flow. In effect, the user may "cut" or "copy" data from a first personal computing device and paste that "data" onto a second computing device.

15 Claims, 7 Drawing Sheets

APPROACHES FOR SHARING DATA BETWEEN ELECTRONIC DEVICES

BACKGROUND

Many users own or are provided with multiple personal electronic devices, such as a personal computer for business, home personal computer, tablet, landline business telephone, home landline telephone, business-issued smartphone, personal mobile phone, or other media player (e.g., TV, DVR, video game console, portable audio device). These personal electronic devices are becoming increasingly integral parts of users' lives such that for many periods of the day, many users can be seen operating one or another of their devices. However, use of some of a user's electronic devices can be limited in certain situations by factors such as location, user context, or suitability of a device for a computing task. For example, a user's office desktop computer may only be available to the user during business hours, a personal laptop computer may not be accessible while the user is driving, or a smartphone may not be convenient for some users to create, edit, and/or view substantial amounts of content such as text, image, animation, and/or video. Under certain circumstances, a user may find herself interacting with a particular personal electronic device when another device may be more suitable or more preferable for performing a specific task. In some situations, switching to the other device may not be an option if the other device is not immediately accessible. In other cases, users may find conventional approaches to switching to the other device inefficient and burdensome.

BRIEF DESCRIPTION OF THE DRAWINGS

Various embodiments in accordance with the present disclosure will be described with reference to the drawings, in which.

DETAILED DESCRIPTION

Figure 1A:
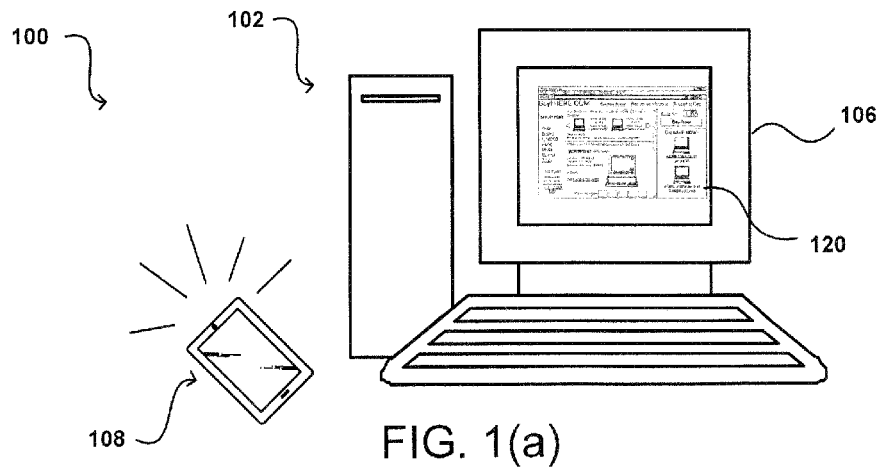
FIGS. 1(a) and 1(b) illustrate an example of sharing data between devices in accordance with an embodiment.

In certain situations, a user who may be interfacing with data on a first personal electronic device may instead elect to continue interacting with that data on a second personal electronic device for various of the aforementioned and other reasons discussed herein. To facilitate this, the data that the user was initially interacting with on the first device must somehow be shared on the second device. A conventional approach for sharing of data between devices is file sharing. A typical process for file sharing may require the user to select the data to be shared from a first application executing on the first device; use a second application on the first device, such as a content editing application capable of recognizing the format of the selected data (e.g., word processor, spreadsheet program, image editor, video editor, etc.); create a new file corresponding to an instance or data type supported by the second application (e.g., document, spreadsheet, JPEG, GIF, PNG, etc.); insert the selected data into the file, and use a third application on the first device to send the file to the second device (e.g., email client, ftp client, cloud storage client). To access the data from the second device, the user may be required to use a fifth application on the second device (e.g., corresponding client network communication application) to obtain the file and a sixth application on the second device (e.g., content editing application capable of recognizing the file type) to access the selected data and perform an intended task. This process can be onerous to a user who may simply desire to propagate a small amount of selected data from one device to another. In addition, creation of a new file can also result in metadata that can be significantly larger than the size of the selected data itself. For example, if the selected data comprises a single byte character, creating a file consisting of a single byte character may result in the file being as large as 16.0 KB using certain applications. Thus, additional data storage space may be taken up on both the first device and the second device, and can result in more data or bandwidth usage associated with sending the data than the user anticipated. The user would also have redundant files that may require clean-up on both devices. Although some of these steps can be skipped if a client application can be used to edit content and directly send the content (e.g., email, Short Message Service (SMS) text editor, instant message (IM) application, virtual notetaking software, etc.), if the selected data originated from a different application, the user would have to cut or copy the selected data and open the client application to paste the selected data into a file to send to the second device. From the second device, the user may have to cut or copy the data from the file sent to the second device using a corresponding client application and paste the selected data into a suitable application to perform an intended task. Thus, the user may have to perform more steps than preferred using such an approach.

Systems and methods in accordance with various embodiments of the present disclosure may overcome one or more of the aforementioned and other deficiencies experienced in conventional approaches to sharing data between devices. In particular, various embodiments enable a user interacting with data selected from a first device to directly share that selected data with a second device. Such data may be characterized as "ephemeral" because it is not persisted as a file in the file system of the first device. Although the data may correspond to a file in the file system, that the data was acquired by a user selecting the data from a running application indicates that the selected data resides in the first device's cache memory or random access memory (RAM) and will be overwritten when a central processing unit (CPU) of the first device performs new instructions. For example, a selected hyperlink is an example of ephemeral data. Although the selected hyperlink may correspond to a file stored in a web browser cache for rendering for display to the user, when the user clicks on (or touches) the hyperlink, the data corresponding to the hyperlink is loaded into RAM or cache memory for processing and that data will be subsequently replaced by new instructions for the CPU. Various embodiments enable for sharing of data, such as ephemeral data, between devices to avoid conventional file storage techniques.

In various embodiments, from a first device, the user can select to share data with one or more other devices based on the proximity of the second device and/or suitability of the other devices to perform certain computing tasks. In certain situations, the other device may not be available for sharing data, such as if the second device is turned off or the first device and/or the second device are incapable of connecting with one another. In some embodiments, the second device will not be selectable from the first device or an interface will indicate that the second device is unavailable. In other embodiments, a notification can be provided to the first device that the other device is unavailable. In some embodiments, the first device can further cause additional actions or tasks to be performed on the second device after data has been shared between devices. For instance, a user may be editing an image at the office and chooses to complete image editing from a home laptop. In an embodiment, the user may share the working image data on the office computer with the home laptop, and can further cause the home laptop to execute an image editing application to open the working image data. When the user operates the home laptop, the user is able to immediately continue working with where she last left off and thereby minimize disruption to her work flow as compared with conventional approaches.

In some embodiments, a first device may automatically recognize telephone numbers within a file and a single click (or touch) by the user on a phone number will cause a second device to dial in the phone number. This may be particularly advantageous when the first device is a desktop computer, laptop computer, or tablet, and the user would prefer to make the phone call from a landline telephone or mobile phone. In other embodiments, a user may select a telephone number within a file and perform a right click (or similar gesture for a touch interface, such as a touch of a second finger) that causes a context menu, shortcuts, a pop-up menu, a dialog box, or other such interface, to be displayed on the first device that allows a user to directly select the telephone number to be dialed in from a second device. In this manner, the user can "click" from a first device and "call" from a second device.

Many other alternatives and variations are described and suggested below in relation to at least some of the various embodiments.

Figure 1B:
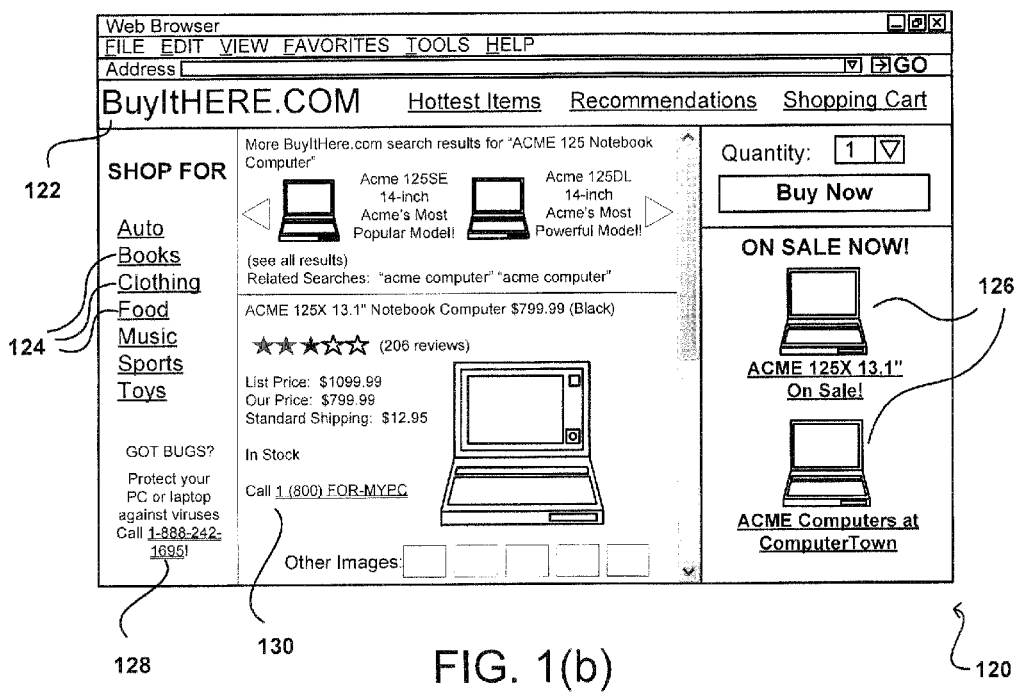

FIGS. 1(a) and 1(b) illustrate an example of sharing data between devices in accordance with an embodiment. In the example situation 100 of FIG. 1(a), a user (not shown) is operating a desktop computer 102 that is executing a web browser 120, which is displayed on a screen 106. Within a close vicinity of a user is a smartphone 108. Although in this instance the user is a single person, in other embodiments a user may comprise multiple persons who are commonly associated, such as a family or a corporation. FIG. 1(b) provides a more in-depth view of the web browser 120, which shows a webpage of a website 122 that includes text elements 124 and image elements 126. Each of the text elements 124 and image elements 126 are associated with hyperlinks such that when an element is selected by a pointer, the web browser will navigate to the URL corresponding to the respective hyperlink of the element. As used herein, a pointer may refer to a virtual cursor, such as a cursor corresponding to user movement by a mouse, pointing stick, or touchpad as well as a physical pointer, such as a user finger (or hand), stylus, or similar implement. Typically, as shown by text elements 124, text elements associated with hyperlinks are single-underlined to indicate to a user that selecting the link will transfer the user to another webpage or cause additional elements to be rendered for display on the webpage. The web page also includes selectable telephone number elements 128 and 130, which are presented in double-underline. In other embodiments, selectable telephone number elements may be presented similarly to conventional text hyperlinks (i.e., single-underline), or other visual indicators can be used to help a user identify a telephone number that can be selected, such as displaying a telephone number element in a different color, font, or style or with an icon, etc.

Conventional web-based approaches for enabling a first user to click on (or touch) a telephone number to launch a telephone call with a second user associated with the telephone number may be referred to as "click-to-call." As used herein, a click may refer to a left click or primary button press of a mouse or touchpad or a touch on a touch interface. Simply referring to a user input as a click should not be construed to mean that an embodiment is limited to a button press. As is known to those of ordinary skill, a touch on a touch interface can be interpreted by a computing device as a similar input as a button click using a mouse, pointing stick, touchpad, or similar input device. In one conventional approach, clicking on a telephone number link will prompt a dialog box requiring the user to enter her phone number in order for the second user to place the call. For some users, it may be inconvenient to type in their respective telephone numbers and/or be at the behest of the second user to initiate the call. Other users may want more direct control over making a telephone call out of concerns for security and privacy, and may not be willing to provide their telephone numbers to an unknown entity. Other conventional approaches allow a device with telephony capabilities, such as a desktop computer, laptop, or tablet equipped with a microphone and speaker that enables Voice over IP (VoIP) or a smartphone capable of connecting to a cellular network, to trigger a phone call directly from the device upon clicking on a telephone number link. There are many instances, however, in which this may be undesirable. Desktop computers, laptops, and tablets are not generally designed for making telephone calls, and placing a call from such devices may be an awkward experience for some users. In addition, the quality of the phone call may be degraded by bandwidth limitations that can result in latency and/or jitter or hardware (e.g., microphone, speakers) that provides poor performance, particularly with respect to a landline telephone or smartphone. In other circumstances, a user may be operating a smartphone indoors to browse a website using a Wi-Fi connection, but may want to conduct a phone call from a landline telephone because Wi-Fi reception and/or cellular connectivity may be less reliable. In addition, using the smartphone phone over VoIP may not be favored by some users because of issues such as security breaches or power failures that may not affect landline telephones. Approaches in accordance with various embodiments can address some of these deficiencies.

In the example of FIGS. 1(a) and 1(b), selection of one of the telephone number elements 128 or 130 (e.g., by clicking on the element while a cursor is positioned over the element or touching the element with a finger or stylus) causes the smartphone 108 to automatically dial in the telephone number corresponding to the element selected by the user. In some embodiments, a device may automatically dial in a telephone number but may also prompt the user for confirmation that the call can be put through before actually dialing the number. In some embodiments, a new pop-up window, an HTML overlay on the web page 120, or other such interface can be displayed to the user after clicking or touching one of the telephone number elements 128 or 130 to indicate that the second device is dialing in the telephone number.

Figure 2:
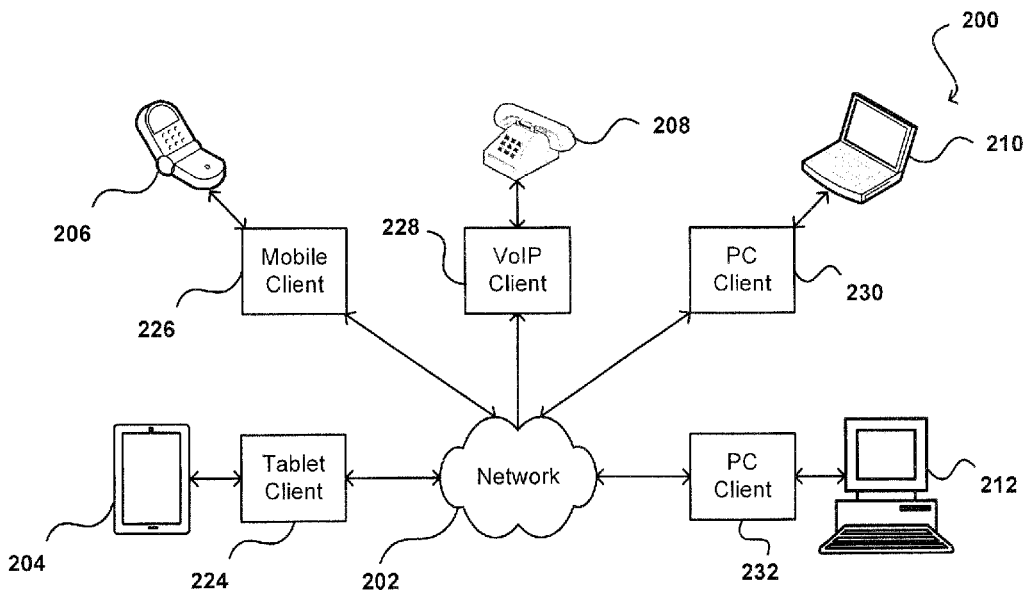
FIG. 2 illustrates an example configuration of multiple electronic devices in accordance with an embodiment.

Although a desktop computer and a smartphone is used in the example of FIGS. 1(a) and 1(b), alternative embodiments use various configurations for enabling a user to share data between a user's multiple devices. FIG. 2 illustrates an example of one such configuration 200. In this example, a user has associated her multiple personal electronic devices with one another by installing client applications 224, 226, 228, 230, and 232 to a tablet 204, a mobile phone 206, a VoIP telephone 208, a laptop 210, and a desktop computer 212, respectively. The tablet 204, mobile phone 206, laptop 210, and desktop computer 212 each comprise computing systems capable of sending to and receiving data from other computing systems, including audio data by incorporating or being connected to a microphone and speakers. These devices may provide multiple ways for a user to place a phone call. For example, the mobile phone 206 can connect to a cellular network or use one of many commercially available VoIP software applications over a Wi-Fi network to conduct a telephone conversation. These devices also include an operating system that may be the same or complementary to another device, or may be a distinct platform from any other device. For example, the tablet 204 and mobile phone 206 share a similar operating system despite differences in architecture while the laptop 210 and desktop computer 212 may use different operating systems despite sharing a similar architecture. The VoIP telephone 208 comprises a dedicated VoIP telephone with an embedded operating system, and is connected to a network via an Ethernet port. Some VoIP telephones also include wireless network connectivity in addition to a wired network connection. In other embodiments, a conventional (digital or analog) telephone may also be adapted to support VoIP using a telephone adapter. The telephone adapter can further include a computing system with an embedded operating system capable of executing a VoIP client application, such as VoIP client 228.

Client applications 224, 226, 228, 230, and 232 are software applications that enable respective devices to communicate with one another over a common network. In one embodiment, the client applications comprise proprietary client software on the devices to connect to the Whispersync network. Other embodiments may be implemented as platform or operating system application programming interfaces (APIs) that can be integrated into user applications for a particular platform or operating system. In still other embodiments, standard client software such as a web browser can be used as client software and devices may be connected through a web interface or via a plug-in, web browser toolbar, and the like. In some embodiments, the system can be implemented adapting or overlaying a messaging protocol such as transport layer protocols Transmission Control Protocol (TCP), User Datagram Protocol (UDP), or Stream Control Transmission Protocol (SCTP) or application layer protocols Simple Mail Transfer Protocol (SMTP), Post Office Protocol (POP), Internet Message Access Protocol (IMAP), Extensible Message and Presence Protocol (XMPP), Internet Relay Chat (IRC), Push Access Protocol (PAP), or other messaging protocols. In other embodiments, a system may be implemented based on a streaming protocol adapted from or overlaying Real-time Transport Protocol (RTP), RTP Control Protocol (RTCP), Real Time Streaming Protocol (RTSP), or similar protocol. In still other embodiments, the system may be implemented as a web services model using Simple Object Access Protocol (SOAP) over HTTP or similar approaches. Some embodiments may also be implemented using or overlaying SMS text messaging services. However, such approaches may be less advantageous than others in view of the size limitations of SMS texts.

At least some of the user's devices may be able to determine their own geographic locations, such as if the device includes a OPS, Wi-Fi, cellular network component, or similar mechanism. Some of the user's devices may also be able to determine their own relative positions with respect to other devices when a device includes a Bluetooth®, radio frequency (RF), or near field communications (NFC) component or a sensor such as a camera, proximity sensor, distance sensor, depth sensor, etc. Location can also be estimated from an IP address associated with a device, or location information of a particular device, such as a desktop computer or landline telephone, may also be specified by a user. Systems and approaches for determining geographic location and relative position are known to those of ordinary skill in the art and will not be discussed herein in detail. In various embodiments, when a user desires to share data between devices, the user may select, from a first device, one or more of her other devices for receiving the data. In at least some embodiments, the other devices that can be selected for sharing data may be provided based on a specified proximity to the user or first device. The specified proximity may be based on the nature of the data to be shared with the other devices and actions to be performed on the other devices utilizing the shared data. For example, if the data to be shared comprises a telephone number and the action relates to initiating a telephone or telecommunication call on one of the other devices, a default specified proximity may be for each of the other devices to be within 10 feet of the user or first device. In some embodiments, the specified proximity can be a threshold distance between devices, and distance can be estimated by determining geolocations between the first device and the other devices using GPS, Wi-Fi, or cellular network components and/or triangulating respective device locations using various sensors such as image sensors, proximity sensors, distance sensors, depth sensors, etc. In other embodiments, the specified proximity may be less precise and the other devices may be determined to be within the specified proximity of the first device based on assumptions such as devices sharing the same Wi-Fi connection; being within range of a same cellular radio tower, being able to connect to one another via Bluetooth, RF, or NFC; being able to capture an image of the other device from the first device; being able to detect a signal or pattern from the first device specifically emitted by the second device (e.g., ultrasonic or infrared); or other similar such approaches. In some embodiments, the user may also be able to reconfigure devices to specify proximities between a first device and other devices for various use cases according to her own preferences. In various embodiments, a listing of devices within the specified proximity of the user or the first device can be provided to the user for selection to share data and/or perform certain computing tasks on a selected device. The listing may be provided in an order based on the respective proximity of the other devices with respect to the first device. The listing may also include information regarding the respective proximity of each of the other devices, the respective distance of each of the other devices, and/or the respective location of each of the other devices. The displayed location of each of the other devices devices location may be based on the respective geolocation coordinates of the other devices, a geographical location (e.g., country, state, city, geographical address, etc.), location within a home (e.g., living room, kitchen, den, etc.), location within a building, location with a room (e.g., desk, bookshelf, etc.), or other descriptive information about location.

In certain situations, some of the user's other devices may be unavailable for a variety of reasons. For example, the other device may be powered down, the first device and/or other device may lack connectivity with a common network, or similar such situations. Under these circumstances, when the user elects to share data with multiple devices, those devices that are unavailable may be excluded in a listing of devices that the user can select from to share data or a user interface may indicate that the unavailable device cannot be selected, such as "graying" out the unavailable device or providing an icon indicating that the unavailable cannot be selected, Alternatively, or in addition, the user may be notified that the other device is unavailable after attempting to share data with that device.

Figure 3A:
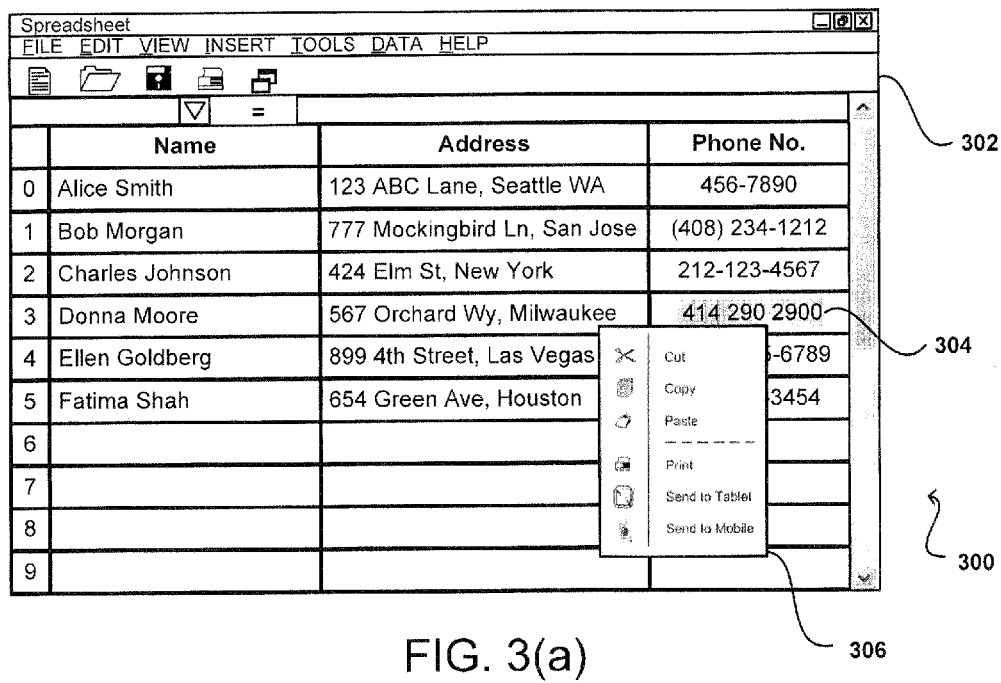
FIGS. 3(a), 3(b), and 3(c) illustrate an example of sharing data between devices in accordance with an embodiment.
Figure 3B:
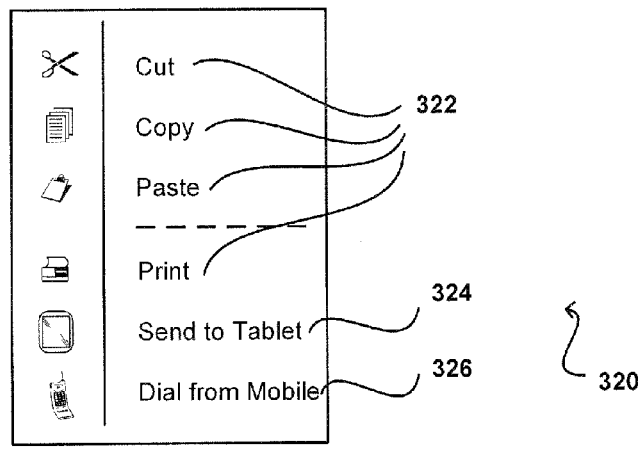
Figure 3C:
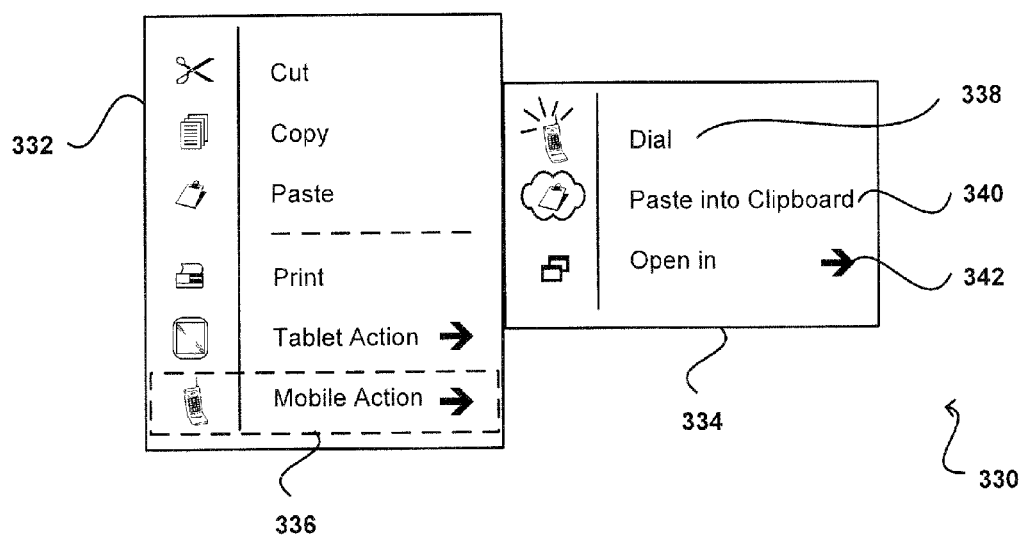

FIGS. 3(a), 3(b), and 3(c) illustrate various examples for sharing data between devices in accordance with embodiments. In the example depicted in FIG. 3(a), a computing device (not shown) is used to operate a spreadsheet program 300 to edit a spreadsheet file 302 comprising a contact list providing names, addresses, and telephone numbers. Data from one data cell 304 of the spreadsheet file 302 has been selected by a user (not shown), and a context menu 306 (sometimes also referred to as a shortcuts menu or pop-up menu) appears below the data cell 304. In some embodiments, context menu 306 is displayed as a result of a "right click" or similar gesture for those devices supporting such input, such as a two-button mouse or touchpad or a touch interface that recognizes a touch of a second finger as a "right click." In other embodiments, the context menu 306 appears after a user finishes selecting data with a pointer (e.g., by releasing a left click or primary button on a two-button mouse or touchpad or discontinuing touching or swiping a touch interface). In still other embodiments, the context menu 306 is displayed after a user finishes selecting data with a pointer and hovers over the selected data for specified period of time, such as 500 ms. As discussed elsewhere herein, a pointer may refer to a virtual cursor corresponding to movement by a mouse, pointing stick, or touchpad or a physical pointer, such as a user finger, stylus, or digital pen. Hovering can refer to moving the pointer over a particular object and maintaining the pointer over the object for at least the specified period of time without selecting (e.g., clicking, touching) the object.

FIG. 3(b) illustrates one example of a context menu 320 that can be displayed according to one of the approaches discussed herein or familiar to those of skill in the art. The context menu includes conventional tasks 322 that can be performed on a selection of data, such as cutting, copying, pasting, or printing the selected data. The context menu also includes a context menu option 324 to "Send to Tablet" and an option 326 to "Dial from Mobile." Option 324 enables the user to send the selected data from the first device to a tablet pre-configured to receive data from the first device. In this example, the tablet may determine a suitable application for receiving the selected data as input and launch the suitable application (if it is not already currently running) to receive the selected data. The determination of a suitable application may be based on the formatting or data type of the ephemeral data. For example, metadata of the selected data may indicate that the selected data was originally obtained from a spreadsheet program on the first device and a spreadsheet program on the second device can be used to receive the selected data. Suitability can also be based on the nature of the command from the first device. A command such as "Send as Text Message" may cause the selected data to be received by an SMS text editor. Alternatively, or in addition, suitability can be configured by the user. For instance, a user may specify that selected data comprising text is to be received by a word processor, a URL is to be received by a web browser, image data is to be received by an image editor, etc. In other embodiments, the options to send selected data to a second device can be more granular and enable the user to specify the application to invoke from the second device as well additional tasks for the second device to perform. For example, context menu option 326 to "Dial from Mobile" specifies the application to launch on the second device, a telephony application, and an additional operation for the telephony application to perform, dialing in the number corresponding to the selected data. As discussed elsewhere herein, the telephone number corresponding to the selected data may be dialed in but the phone call may not necessarily be put through in some cases until confirmation for placing the call is received from the user at the second device. Whether confirmation for placing the call is required can be a user setting that can be modified based on a particular user's preference.

FIG. 3(b) illustrates another example of a context menu 330 that can be displayed to a user in accordance with an embodiment. The context menu 330 is a hierarchical menu that enables a user more direct control over how selected data may be shared with a second electronic device, including an initial or primary menu level 332, a secondary menu level 336, and a tertiary menu level corresponding to the selection of context sub-menu option 342. In this example, the user has selected context menu option 336 corresponding to various actions related to a mobile device that has been pre-configured to receive and carry out commands from the first device displaying the context menu 330. Selection of menu option 336 causes a second hierarchical level 334 of the context menu to be displayed, providing the user with sub-menu options 338, 340, and 342. Sub-menu option 338 corresponds to a command from the first device for the second device to dial the number associated with the selected data. As discussed elsewhere herein, smartphone may have many ways of placing phone calls, such as via a cellular network or over VoIP using a number of applicable software. Each of the various telephony applications on the second device may be presented as a different menu option in some embodiments. In other embodiments, each telephony application may be presented as another hierarchical level of the context menu. In still other embodiments, the second device can be configured by a user to use a single default telephony application.

Sub-menu option 340 corresponds to a command from the first device to insert the selected data into a "clipboard" on the second device. A clipboard can refer to an operating system feature, typically implemented as a runtime data buffer, that enables a user to copy a selection of data onto the buffer that can be shared by most (if not all) applications running on the operating system. On some devices, a clipboard may only support single transactions such that every cut or copy command overwrites the previous contents of the clipboard. On certain other platforms, multiple transactions may be supported, wherein several cut or copy commands can be stored and queued up to a certain number of cut and copy transactions. Typically, cut or copy commands in these platforms are ordered last-in, first-out such that a paste operation will correspond to the last cut or copy command by default but an interface may be provided for the user to select data from a different portion of the queue from which to paste a selection of data. Preferably, the second device supports multiple transactions to ensure that the user is less likely to accidentally overwrite the previous contents of the clipboard. For those devices running on platforms that only support single clipboard transactions, the second device can require confirmation from the user at the second device to overwrite the contents of the clipboard before the "Paste into Clipboard" command is invoked on the second device. Clipboard data can be limited to plaintext in some operating systems. Other operating systems support multiple types of data, including text, image, or video as well as metadata associated with such data. For example, a cut or copy command from a selection of data in a word processing document may preserve the plaintext as well as the font, style, color, etc. specified in the original document from which the cut or copy command was invoked. Similarly, a cut or copy command from a selection of data in a spreadsheet file may retain the formulas and data used to calculate the selected data. In some embodiments, the "Paste into Clipboard" command 340 will provide the selected data in as many data formats as possible so as to be more likely to recognizable by multiple platforms and applications of a second device. In some embodiments where both the first device and second device support a multi-transaction clipboard, the entire contents of the clipboard of the first device can be shared with the clipboard of the second device, such as a "Paste all into Clipboard" command.

Sub-menu option 340 corresponds to a command from the first device for the second device to open a specified application on the second device and pass the selected data as input for the specified application. For instance, a user may be operating a desktop computer at the office and making plans for that evening by browsing the Internet for a restaurant to patronize. Using the various approaches disclosed herein, the user can select the physical address for a restaurant from the desktop web browser and direct his mobile phone to open a mapping application on the mobile phone (if the map application is not already running) to receive the selected data corresponding to the restaurant address as an input to the map application. In other cases, the specified application may create a file or other data structure of a type and data format corresponding to the specified application and insert the selected data into the file. For example, the selected data may comprise text and the specified application on the second device may be an email client, SMS text editor, or instant messenger. Selection of one of these applications may cause the second device to launch the application to generate a new email, text message, or instant message, respectively, which incorporates the selected data.

Although the telephone numbers in the spreadsheet in FIGS. 3(a), 3(b), and 3(c) have not been automatically recognized as telephone numbers, it will be appreciated that telephone numbers can be automatically recognized outside of a web browser in other embodiments. For example, many conventional content viewing and editing programs, such as word processors, spreadsheet programs, email clients, PDF viewers, etc. use a web engine to render HTML. Data expressed in HTML format in such applications may be rendered for display as the data would be displayed by a web browser. Further, telephone numbers may be encoded in HTML using the tel uniform resource identifier (URI) scheme. For instance, data cell 304 can be encoded as:

<a href="tel:414 290 2900">414 290 290 2900</a>.

When a user clicks on (or touches) an element encoded in this manner and rendered for display as a hyperlink by a content editing or viewing application, the device's operating system will invoke the application designated to handle the tel URI scheme and pass the telephone number as a parameter to the designated application. Many device operating systems include a registry that enables developers to designate a specific application for handling particular file types or URI schemes. The operating system registry of a first device can be modified to invoke the client application that causes the second device to dial a selected number as the handler for the tel URI scheme. In other embodiments, a custom URI scheme can be used to encode telephone numbers, and the device operating system registry can be configured to launch the client application upon selection of an element encoded using the custom URI scheme. Another approach for automating detection of telephone numbers can be to use regular expressions. For instance, telephone numbers are often expressed in a limited number of formats, such as:

nnn-nnnn
(nnn)nnn-nnnn
nnn-nnn-nnnn
nnn nnn nnnn

Plug-ins for content viewing and editing applications or operating system-level programming interfaces can be developed that use regular expressions to find these limited number of patterns and render data matching the patterns in a manner such that a user could select a telephone number with a single click that calls the client application on the first device to direct the second device to dial a selected telephone number. Various other approaches can be used to automatically detect telephone numbers within text, image, or video data as is familiar to those of ordinary skill in the art, and will not be discussed further herein in detail.

Figure 4:
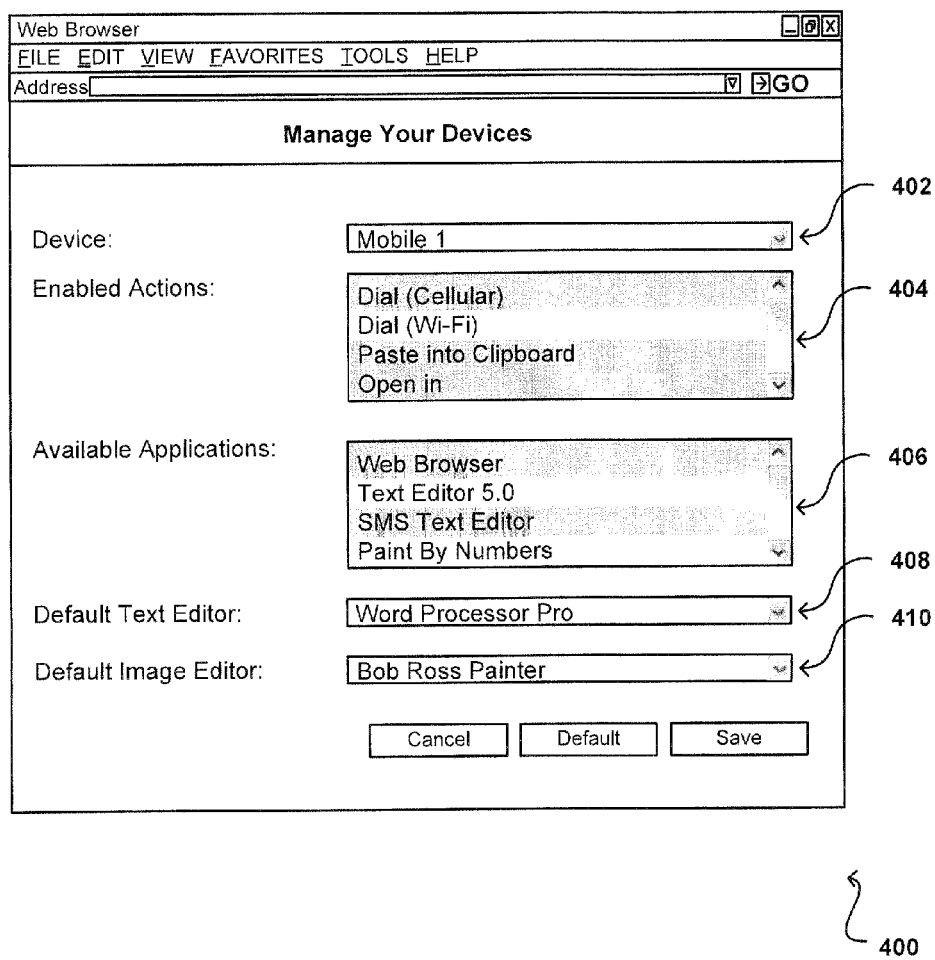
FIG. 4 illustrates an example of an approach for configuring multiple devices to enable data to be shared between the devices in accordance with various embodiments.

FIG. 4 illustrates an example of an approach for configuring a user's multiple devices to enable data to be shared between the devices in accordance with various embodiments. In this example, a web interface 400 is provided as a centralized location for a user to register and unregister devices that can be configured to share data, define the parameters by which one device may interact with one another, and set user preferences such as default applications to use for various data types or other ways a user may interact with a device (e.g., whether to require confirmation from the user to place a phone call, whether to require confirmation to overwrite clipboard contents, etc.). In other embodiments, configuration may be incorporated into a proprietary client application that can also implement the communication protocols for device interconnection, security, logging, and other such features. In some embodiments, configuration may be granular and enable a user to specify the actions, applications, and other parameters that one device may access with respect to each of the user's other multiple devices. In this example, devices are configured from the perspective of one device with respect to all other devices. Here, a drop-down list 402 enables the user to choose which particular device to configure. Selection of a device at the drop-down list 402 will dynamically populate the actions that can be performed for the selected device and the applications of the selected device that can be exposed to other devices. Such information can be obtained when a user device is registered into the web service providing web interface 400, and can be periodically updated based on changes made to a device. Web interface 400 shows that a first mobile device has been selected for configuration at drop-down list 402. The actions that are available for that device are displayed as a multi-select form element 404, allowing a user to enable or disable actions that other devices may take with respect to the selected device. In addition, a list of the applications installed on a selected device is presented as a second multi-select form element 406 which can enable the user to configure which of a selected device's applications can be exposed to other devices. In some embodiments, form element 406 may depend on the selections made at form element 404. For instance, disabling the capability of other devices to command a selected device to make a phone call over VoIP at form element 404 may automatically preclude presentation of VoIP applications at form element 406. Another approach may be to list such applications but disable their selection, such as by "graying" out the applications at form element 406. In this example, the user has selected to enable the actions "Dial (Cellular)," "Paste into Clipboard," and "Open In," and disable the action "Dial (Wi-Fi)" at form element 404 and enable other devices to invoke applications "Web Browser" and a "SMS Text Editor" but not applications "Text Editor 5.0" and "Paint By Numbers" at form element 406. Configuration interface 400 further includes elements 408 and 410 to enable a user to set default applications to handle instances of selected data comprising text and image data, respectively. It will be appreciated, of course, that many more actions and applications are available for the mobile device and these actions and applications are set forth herein as examples for explanatory purposes and should not be construed so as to limit the scope of other embodiments.

Figure 5:
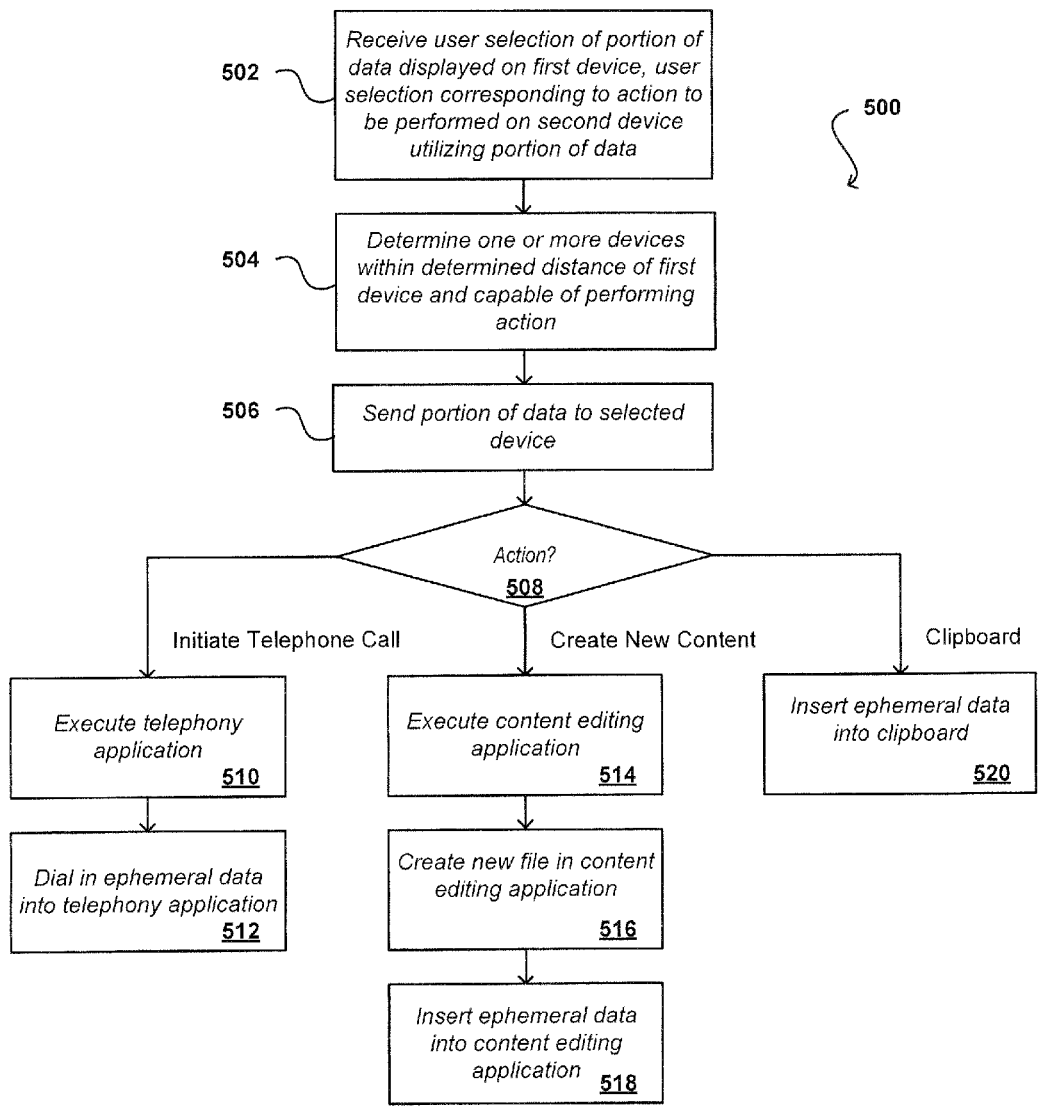
FIG. 5 illustrates an example process of sharing data between devices in accordance with various embodiments.

FIG. 5 illustrates an example process 500 for sharing data between electronic devices that can be utilized in accordance with various embodiments. It should be understood, however, that there can be additional, fewer, or alternative steps performed in similar or alternative orders, or in parallel, within the scope of the various embodiments unless otherwise stated. In this example, a first user device is operated to receive a user selection of a portion of data displayed on a first device, the user selection corresponding to an action to be performed on a second device utilizing the portion of the data 502. The request may also include an implicit or explicit selection of an application on the second device to receive the selection of data. For instance, a user interface provided on the first device may enable a user to explicitly send a selection of data to a web browser, word processor, clipboard function, etc. on the second device. Alternatively, or in addition, devices can be configured such that data comprising certain data types will be handled by specific applications. In some embodiments, the user can send ephemeral data from a first device to a second device. For example, a first application executing on the first device can generate application data during the course of execution. Application data may refer to the runtime data stored in volatile memory as an application is executed. The application data in this example is not persisted—the application data will be erased once the application is closed. Although application data may correspond to data of a file stored in hard disk, such data is distinguishable as there is at least one copy residing in volatile memory (application data) and another copy in hard disk (file). For instance, if the first application is a word processor, the application data may comprise a volume of text of a document being created and/or edited by a user. As another example, if the first application is a web browser, the application data may comprise the contents of a webpage rendered for display to the user as the user is browsing the Internet. Although the application data may correspond to data in files on disk, such as by a user saving the first example of application data as a word processing document or a web browser caching the second example of application data in the web browser cache, both types of application data will be erased from volatile memory when the word processor and web browser are respectively closed. Ephemeral data is even less permanent than application data as ephemeral data comprises that subset of the application data a user selects at the most current moment, such as by right-clicking on a selection of the application data (or a prolonged touch, swipe, or similar gesture for a touch interface). A request can be made to send the ephemeral data from the first application to a second application on a second device in at least some embodiments. The second application may be selected by the first device, the second device, a centralized computing system enabling connection between the first device and the device, or the user in various embodiments. The second application may be explicitly selected by the user, such as by selecting from a context menu as discussed with respect to FIGS. 3(b) and 3(c). The FIGS. 3(b) and 3(c). The request may also be made implicitly by the user, such as by the user configuring a device to cause ephemeral data corresponding to certain data types to be sent to a specific application on the second device, configuring a device to execute a default application upon encountering a tel URI scheme or a custom URI scheme, and other approaches known to those of ordinary skill in the art.

In various embodiments, a user may be associated with multiple devices and a request by the user to share data with a second device may cause a determination of which of the user's other devices are available for sharing data with the user's first device. In at least some embodiments, when multiple devices are available, a listing of the available devices can be provided to the user when the available devices are within a specified proximity of the user's first device 504. As discussed herein, the specified proximity may comprise a threshold distance between the first device and available devices or may be based on various assumptions regarding device proximity, such as devices assuming to be proximate when devices share a common Wi-Fi connection, being within range of a common cellular radio tower, or other approaches for short-range wireless connectivity or sensing. The shared data can then be sent to a selected second device 506 whereupon there may be a determination regarding the second application for receiving the ephemeral data 508. In the event that the second device is commanded to initiate a telephone call 510, the second device may automatically execute a telephony application to initiate a telephone or telecommunication call using the telephone number 512 corresponding to the shared data. In the event that action is determined to comprise creating new content, the second device may execute a content editing application 514 to create a new file and insert the shared data into the new file 516 without a user directly operating the second device. Content can refer to text, image, audio, animation, and/or video data and a content editing application enables a user to create or edit such data. A content editing application may include a word processor, Portable Document Format (PDF) editor, notetaking program, spreadsheet program, presentation program, database, diagramming program, image editor, video editor, email client, SMS text editor, instant messenger, a social networking client enabling status updates or messaging, or variations thereof. In the event that that the action relates to the respective clipboard features of the first and second device, the shared data may be inserted into the clipboard 520. Although example process 500 describes instances where the second application may be a telephony application, content editor, or clipboard, it will be appreciated that the disclosure herein is not so limited. For example, various embodiments also allow for a user to select a geographical address displayed in a browser in one device and send that selected address to a mapping application on a second device so that map directions can be pre-loaded on the second device; select a URL (whether in the form of a bookmark or an http address) to be pre-loaded on a web browser of the second device; and auto-fill contact information or a calendar or appointment entry from a selection of data. Other similar approaches are contemplated by this disclosure, and are well within the scope of the invention.

Figure 6:
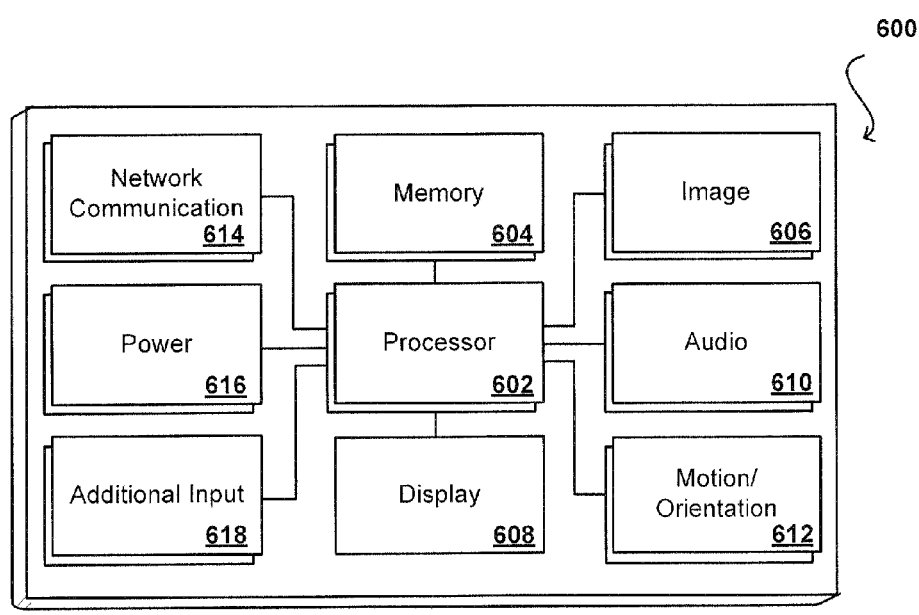
FIG. 6 illustrates an example configuration of a computing device that can be used in in accordance with various embodiments.

In order to provide various functionality described herein, FIG. 6 illustrates an example set of basic components of a computing device 600. In this example, the device 600 includes one or more processors 602 for executing instructions that can be stored in memory 604. As would be apparent to one of ordinary skill in the art, memory can include many types of data storage or non-transitory computer-readable storage media, such as data storage for program instructions for execution by the processor 602, a separate storage that can be used for images or data, a removable memory for sharing information with other devices, etc.

The device 600 includes a display element 608, such as a touch screen, electronic ink (e-ink), organic light emitting diode (OLED) or liquid crystal display (LCD), etc., although devices such as portable media players might convey information via other means, such as through audio speakers. In at least some embodiments, the display screen provides for touch, swipe-based, and/or hover input using, for example, capacitive, resistive, infrared, optical image, piezoelectric, acoustic or ultrasonic sensor technology. The device in many embodiments will include one or more cameras or other image capture elements 606 for capturing image and video content. In at least some embodiments, the device can use the image (or video) information to determine gestures or motions of the user, which will enable the user to provide input through the device without having to actually contact and/or move the device. A camera can include, or be based at least in part upon any appropriate technology, such as a CCD or CMOS image sensor having a sufficient resolution, focal range, viewable area to capture image or video data. An image sensor can also include an infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The device, in many embodiments, will include an audio input and/or output element 610, such as a microphone or audio speaker(s). The microphone may be a mono or stereo microphone or microphone array, operable to capture audio information from at least one primary direction. A microphone can be a uni- or omni-directional microphone as known for such components. The microphone may be used to facilitate voice-enabled functions, such as voice recognition, digital recording, etc. In addition, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device may turn on the display element and display information for nearby restaurants, etc. A user can have the option of turning off voice recording and conversation monitoring for privacy and other such purposes. The audio speaker(s) may perform audio output. In some embodiments, the audio speaker(s) may reside separately from the device.

The device may also include a motion/orientation element 612 that can provide information such as a position, direction, motion, or orientation of the device. The motion/orientation element 612 can include an accelerometer or gyroscope operable to detect an orientation and/or change in orientation, or an electronic or digital compass, which can indicate a direction in which the device is determined to be facing. The motion/orientation element also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 602, whereby the device can perform any of a number of actions described or suggested herein.

The example device 600 also includes one or more communication elements or networking sub-systems 614, such as a Wi-Fi, cellular, Bluetooth, RF, wired, or wireless communication system. The device in many embodiments can communicate with a network, such as the Internet, and may be able to communicate with other such devices. The example device 600 includes various power components 616 known in the art for providing power to a computing device, which can include capacitive charging elements for use with a power pad or similar device as discussed elsewhere herein.

The example device 600 can also include one or more additional input elements 618 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands, such that a user can control the device without having to be in contact with the device. In some embodiments, an additional input element 618 may include a touch and/or pressure sensitive element, such as a touch sensitive material around a casing of the device with at least one region capable of providing squeeze-based input to the device, etc. In some embodiments this material can be used to determine motion, such as of the device or a user's finger, for example, while in other embodiments the material will be used to provide specific inputs or commands. In some embodiments, the additional input element 618 may also include a proximity sensor, which can be part of, or separate from, the display assembly. The proximity sensor may be implemented using capacitive, inductive, optical image, infrared, laser, magnetic, acoustic or ultrasonic sensor technology, or other mechanisms known to those of skill in the art. The proximity sensor can be operated to determine relative distances or absolute distances with respect to the device or with respect to objects in the vicinity of the device. In some embodiments, the additional input element 618 may further include other sensors such as a thermometer, altimeter, barometer, humidity sensor, health monitor (e.g., heart rate, blood pressure, blood glucose level, etc.), or environmental sensor (e.g., pollen count, air quality, UV radiation).

In some embodiments, the additional input element 618 may include a light-detecting sensor that is able to determine whether the device is exposed to ambient light or is in relative or complete darkness. Such an element can be beneficial in a number of ways. In some embodiments, a light-detecting element can be used to determine when a user is holding the device to the user's face (causing the light-detecting element to be substantially shielded from ambient light), which can trigger an action such as the display element of the device to temporarily shut off (since the user cannot see the display element while holding the device to the user's ear). The light-detecting element could also be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device, and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Figure 7:
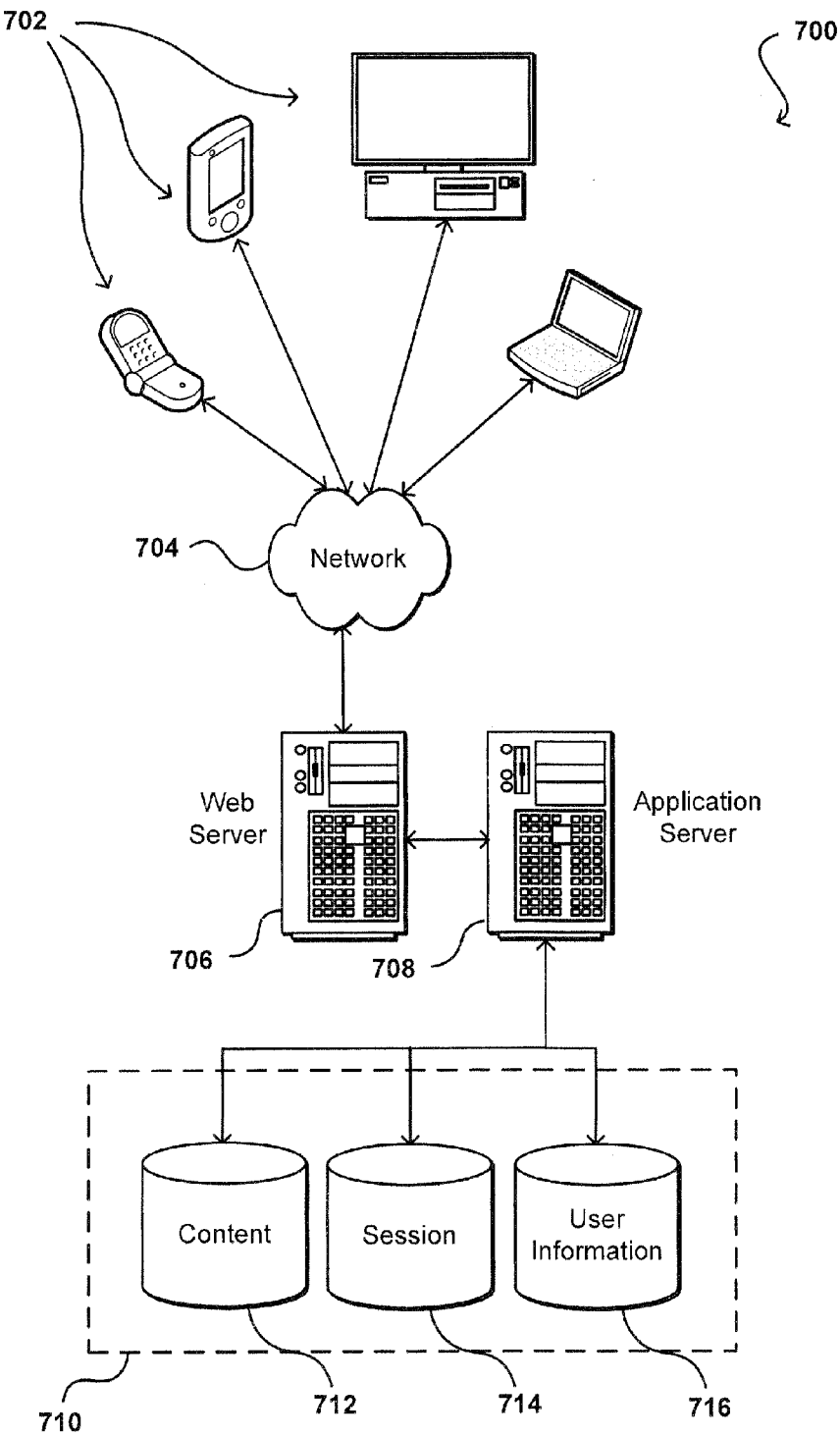
FIG. 7 illustrates an example environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes one or more electronic client devices 702, such as those illustrated in FIG. 3, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least an application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the devices 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computer-implemented method for sharing data between user devices, comprising:
    displaying data on a display of a first device, at least a portion of the data corresponding to one or more telephone numbers;
    receiving a first user selection of a telephone number of the one or more telephone numbers:
    in response to receiving the first user selection of the telephone number,
        determining one or more devices within a specified proximity of the first device and capable of initiating a telecommunication call with the telephone number at a current period of time; and
        displaying, on the display of the first device, a listing of the one or more devices determined to be within the specified proximity of the first device and capable of initiating the telecommunication call with the telephone number at the current period of time;
    receiving a second user selection of a second device of the one or more devices; and
    in response to receiving the second user selection, sending the telephone number from the first device to the second device to cause the second device to execute a telephony application and automatically dial the telephone number using the telephony application.

2. The computer-implemented method of claim 1, wherein the listing includes at least one of:
- an ordering of each device of the one or more devices based at least in part upon a respective proximity of the device with respect to the first device;
- a respective distance of each device of the one or more devices between the device and the first device; or
- a respective location of each device of the one or more devices.

3. The computer-implemented method of claim 1, further comprising:
- requiring at least one user input at the second device prior to initiating the telecommunication call with the telephone number.

4. A computer-implemented method for sharing data, comprising:
- obtaining a first selection of a telephone number on a first device, the first selection corresponding to an application on one or more devices capable of utilizing the telephone number;
- in response to obtaining the first selection, determining the one or more devices within a specified proximity of the first device and capable of executing the application and initiating a telecommunication call with the telephone number at a current period of time;
- obtaining a second selection of a second device from among the one or more devices determined to be within the specified proximity of the first device and capable of executing the application and initiating the telecommunication call with the telephone number at the current period of time; and
- sending the telephone number from the first device to the second device to cause the second device to execute the application and automatically dial the telephone number to initiate the telecommunication call.

5. The computer-implemented method of claim 4, further comprising:
- in further response to receiving the first selection, providing a listing of the one or more devices determined to be within the specified proximity of the first device and capable of executing the application and initiating the telecommunication call with the telephone number at the current period of time.

6. The computer-implemented method of claim 5, wherein the listing includes at least one of:
- an ordering of each device of the one or more devices based at least in part upon a respective proximity of the device with respect to the first device;
- a respective distance of each device of the one or more devices between the device and the first device; or
- a respective location of each device of the one or more devices.

7. The computer-implemented method of claim 5, further comprising:
- requiring at least one user input at the second device prior to initiating the telecommunication call using the telephone number.

8. The computer-implemented method of claim 5, further comprising:
- determining that the first device stores a plurality of telephone numbers; and
- rendering each of the one or more telephone number for display on the first device in such a manner that a user may select one of the plurality of telephone numbers with one of a single click or a single touch.

9. The computer-implemented method of claim 4, further comprising:
- in further response to obtaining the second selection of the second device, causing the second device to automatically launch the application.

10. The computer-implemented method of claim 4, wherein the application is a telephony application.

11. A computing device, comprising:
- a processor;
- a memory device including instructions that, when executed by the processor, cause the computing device to:
  - obtain a first selection of a telephone number on the computing device, the first selection corresponding to an application on one or more devices capable of utilizing the telephone number;
  - in response to obtaining the first selection, determine the one or more devices within a specified proximity of the computing device and capable of executing the application and initiating a telecommunication call with the telephone number at a current period of time;
  - obtain a second selection of a second device from among the one or more devices determined to be within the specified proximity of the computing device and capable of executing the application and initiating the telecommunication call with the telephone number at the current period of time; and
  - send the telephone number from the computing device to the second device to cause the second device to execute the application and automatically dial the telephone number to initiate the telecommunication call.

12. The computing device of claim 11, wherein the instructions when executed further cause the computing device to:
- in further response to receiving the first selection, provide a listing of the one or more devices determined to be within the specified proximity of the computing device and capable of executing the application and initiating the telecommunication call with the telephone number at the current period of time.

13. The computing device of claim 11, wherein the application is a telephony application.

14. A non-transitory computer-readable storage medium storing instructions for sharing data, the instructions when executed by one or more processors causing a computing system to:
- obtain a first selection of a telephone number on a first device, the first selection corresponding to an application on one or more devices capable of utilizing the telephone number;
- in response to obtaining the first selection, determining the one or more devices within a specified proximity of the first device and capable of executing the application and initiating a telecommunication call with the telephone number at a current period of time;
- obtaining a second selection of a second device from among the one or more devices determined to be within the specified proximity of the first device and capable of executing the application and initiating the telecommunication call with the telephone number at the current period of time; and
- send the portion of the data from the first device to the second device to cause the second device to execute the application and automatically dial the telephone number to initiate the telecommunication call.

15. The non-transitory computer-readable storage medium of claim 14, wherein the instructions when executed further cause the computing system to:
  in further response to obtaining the second selection of the second device, cause the second device to automatically launch the application.

\* \* \* \* \*